(12) United States Patent
Heim

(10) Patent No.: US 9,415,622 B2
(45) Date of Patent: Aug. 16, 2016

(54) SECURITY ELEMENT WITH OPTICALLY VARIABLE ELEMENT

(75) Inventor: Manfred Heim, Bad Tolz (DE)

(73) Assignee: Giesecke & Devrient GMBH, Munich (DE)

(*) Notice: Subject to any disclaimer, the term of this patent is extended or adjusted under 35 U.S.C. 154(b) by 437 days.

(21) Appl. No.: 12/997,323

(22) PCT Filed: May 28, 2009

(86) PCT No.: PCT/EP2009/003791
§ 371 (c)(1),
(2), (4) Date: Dec. 10, 2010

(87) PCT Pub. No.: WO2009/149831
PCT Pub. Date: Dec. 17, 2009

(65) Prior Publication Data
US 2011/0101670 A1   May 5, 2011

(30) Foreign Application Priority Data
Jun. 12, 2008  (DE) .................. 10 2008 028 187

(51) Int. Cl.
B42D 25/328   (2014.01)
G02B 5/28     (2006.01)
(Continued)

(52) U.S. Cl.
CPC ............ *B42D 25/328* (2014.10); *B42D 25/351* (2014.10); *B42D 25/36* (2014.10); *B42D 25/373* (2014.10); *G02B 5/283* (2013.01); *G02B 5/285* (2013.01)

(58) Field of Classification Search
CPC .... B42D 25/36; B42D 25/351; B42D 25/373; B42D 25/328

USPC .................. 283/85, 87, 72, 90, 93; 428/195.1
See application file for complete search history.

(56) References Cited

U.S. PATENT DOCUMENTS 4,434,010 A    2/1984  Ash
6,586,098 B1   7/2003  Coulter et al.
(Continued)

FOREIGN PATENT DOCUMENTS

DE       10226114 A1      7/2003
DE      102004039355 A1   2/2006
(Continued)

OTHER PUBLICATIONS

U.S. Appl. No. 11/568,388, filed Oct. 26, 2006, Hoffmuller.
(Continued)

*Primary Examiner* — Shelley Self
*Assistant Examiner* — Matthew G Katcoff
(74) *Attorney, Agent, or Firm* — Lathrop & Gage LLP

(57) ABSTRACT

The invention relates to a security element of at least one thin layer element in form of a multi-layer composition, capable of interference. The multi-layer composition, capable of interference, consists of at least one reflecting layer, at least one partially transmitting layer and at least one dielectric layer arranged between these layers.
According to the invention the security element comprises in a first region a multitude of gaps in the reflecting layer and in a second region at least one gap or a multitude of gaps in the partially transmitting layer. Herein the second region is arranged at least partially within the first region and the total area of the second region, which is at least partially arranged within the first region, is smaller than the total area of the first region. Therefore the security element displays, when viewed from the partially transmitting layer, a different appearance in top view than in transmission view.

17 Claims, 4 Drawing Sheets

Figure 1:
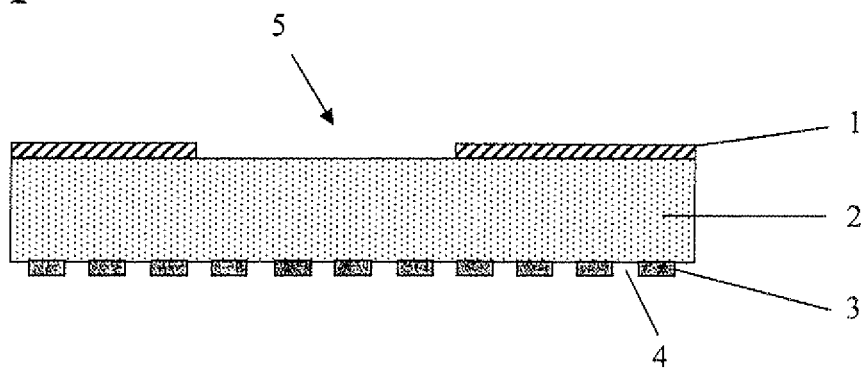

(51) Int. Cl.
*B42D 25/36* (2014.01)
*B42D 25/351* (2014.01)
*B42D 25/373* (2014.01)

(56) References Cited

U.S. PATENT DOCUMENTS

| | | | |
|---|---|---|---|
| 6,699,313 B2 | 3/2004 | Coulter et al. | |
| 7,316,422 B1* | 1/2008 | Schmitz | 283/91 |
| 7,667,894 B2 | 2/2010 | Hoffmuller | |
| 7,728,931 B2 | 6/2010 | Hoffmuller | |
| 7,808,605 B2 | 10/2010 | Hoffmuller | |
| 7,986,459 B2 | 7/2011 | Kaule | |
| 8,083,894 B2 | 12/2011 | Gruszczynski | |
| 8,149,511 B2 | 4/2012 | Kaule | |
| 2002/0172807 A1* | 11/2002 | Ridyard et al. | 428/195 |
| 2005/0082819 A1* | 4/2005 | Tompkin et al. | 283/72 |
| 2005/0127663 A1* | 6/2005 | Heim | 283/72 |
| 2005/0141094 A1* | 6/2005 | Wild et al. | 359/586 |
| 2007/0114787 A1* | 5/2007 | Heim | 283/72 |
| 2007/0165182 A1* | 7/2007 | Hoffmuller et al. | 349/187 |
| 2007/0216518 A1 | 9/2007 | Hoffmuller | |
| 2007/0229928 A1* | 10/2007 | Hoffmuller et al. | 359/15 |
| 2008/0024847 A1* | 1/2008 | Kittler et al. | 359/2 |
| 2008/0160226 A1* | 7/2008 | Kaule et al. | 428/29 |
| 2008/0198468 A1 | 8/2008 | Kaule | |
| 2009/0008923 A1 | 1/2009 | Kaule | |
| 2009/0115185 A1 | 5/2009 | Hoffmuller | |
| 2009/0236061 A1 | 9/2009 | Gruszczynski | |
| 2009/0297805 A1 | 12/2009 | Dichtl | |
| 2009/0322071 A1 | 12/2009 | Dichtl | |
| 2010/0175843 A1 | 7/2010 | Gregarek | |
| 2010/0177094 A1 | 7/2010 | Kaule | |
| 2010/0182221 A1 | 7/2010 | Kaule | |
| 2010/0194091 A1 | 8/2010 | Heim | |
| 2010/0194532 A1 | 8/2010 | Kaule | |
| 2010/0196587 A1 | 8/2010 | Keller | |
| 2010/0207376 A1 | 8/2010 | Heim | |
| 2010/0208036 A1 | 8/2010 | Kaule | |
| 2010/0307705 A1 | 12/2010 | Rahm | |
| 2010/0308570 A1 | 12/2010 | Heim | |
| 2010/0320742 A1 | 12/2010 | Hoffmuller | |
| 2011/0007374 A1 | 1/2011 | Heim | |
| 2011/0012337 A1 | 1/2011 | Heim | |
| 2011/0027538 A1 | 2/2011 | Hoffmann | |
| 2011/0045248 A1 | 2/2011 | Hoffmuller | |
| 2011/0069360 A1 | 3/2011 | Dichtl | |
| 2011/0079997 A1 | 4/2011 | Heim | |
| 2011/0091665 A1 | 4/2011 | Heim | |
| 2011/0095518 A1 | 4/2011 | Hoffmuller | |
| 2011/0101670 A1 | 5/2011 | Heim | |
| 2011/0109078 A1 | 5/2011 | Hoffmuller | |
| 2011/0114733 A1 | 5/2011 | Heim | |
| 2011/0157183 A1 | 6/2011 | Kaule | |
| 2012/0126525 A1 | 5/2012 | Dorfler | |
| 2012/0168515 A1 | 7/2012 | Schutzmann | |
| 2012/0170124 A1 | 7/2012 | Fuhse | |

FOREIGN PATENT DOCUMENTS

| | | |
|---|---|---|
| DE | 102006062281 A1 | 6/2008 |
| FR | 2830791 A1 | 4/2003 |
| GB | 2250474 A | 6/1992 |
| GB | 2282563 A | 4/1995 |
| WO | WO 01/03945 A1 | 1/2001 |
| WO | WO 03/095228 A1 | 11/2003 |
| WO | WO 2005/108110 | 11/2005 |
| WO | WO 2005105473 | 11/2005 |
| WO | WO 2005105474 | 11/2005 |
| WO | WO 2005105475 | 11/2005 |
| WO | WO 2005108106 | 11/2005 |
| WO | WO 2005108108 | 11/2005 |
| WO | WO 2005108110 | 11/2005 |
| WO | WO 2006005434 | 1/2006 |
| WO | WO 2006015733 | 2/2006 |
| WO | WO 2006018171 | 2/2006 |
| WO | WO 2006018172 | 2/2006 |
| WO | WO 2006040069 | 4/2006 |
| WO | WO 2006056342 | 6/2006 |
| WO | WO 2006072380 | 7/2006 |
| WO | WO 2006087138 | 8/2006 |
| WO | WO 2006099971 | 9/2006 |
| WO | WO 2006119896 | 11/2006 |
| WO | WO 2006128607 | 12/2006 |
| WO | WO 2007006445 | 1/2007 |
| WO | WO 2007006455 | 1/2007 |
| WO | WO 2007076952 | 7/2007 |
| WO | WO 2007079851 | 7/2007 |
| WO | WO 2007115648 | 10/2007 |
| WO | WO 2008/000350 | 1/2008 |
| WO | WO 2008/000351 | 1/2008 |
| WO | WO 2008/049533 | 5/2008 |
| WO | WO 2008/061636 | 5/2008 |
| WO | WO 2008/071325 | 6/2008 |
| WO | WO 2009/000527 | 12/2008 |
| WO | WO 2009/000528 | 12/2008 |
| WO | WO 2009/000529 | 12/2008 |
| WO | WO 2009/000530 | 12/2008 |
| WO | WO 2009/012893 | 1/2009 |
| WO | WO 2009/024265 | 2/2009 |
| WO | WO 2009/080262 | 7/2009 |
| WO | WO 2009/080263 | 7/2009 |
| WO | WO 2009/083146 | 7/2009 |
| WO | WO 2009/083151 | 7/2009 |
| WO | WO 2009/100831 | 8/2009 |
| WO | WO 2009/100869 | 8/2009 |
| WO | WO 2009/109291 | 9/2009 |
| WO | WO 2009/121578 | 10/2009 |
| WO | WO 2009/149831 | 12/2009 |
| WO | WO 2009/149833 | 12/2009 |
| WO | WO 2009/156079 | 12/2009 |
| WO | WO 2010/000470 | 1/2010 |
| WO | WO 2010/003646 | 1/2010 |
| WO | WO 2010/028739 | 3/2010 |
| WO | WO 2011/012281 | 2/2011 |
| WO | WO 2011/032665 | 3/2011 |
| WO | WO 2011/032671 | 3/2011 |

OTHER PUBLICATIONS

U.S. Appl. No. 11/568,390, filed Oct. 26, 2006, Hoffmuller.
U.S. Appl. No. 11/568,535, filed Nov. 12, 2007, Depta.
U.S. Appl. No. 11/568,538, filed Sep. 23, 2008, Depta.
U.S. Appl. No. 11/571,923, filed Jan. 10, 2007, Hoffmuller.
U.S. Appl. No. 11/573,060, filed Feb. 1, 2007, Depta.
U.S. Appl. No. 11/573,484, filed Feb. 9, 2007, Heim.
U.S. Appl. No. 11/573,506, filed Feb. 9, 2007, Burchard.
U.S. Appl. No. 11/576,583, filed Apr. 3, 2007, Heim.
U.S. Appl. No. 11/719,843, filed Apr. 3, 2008, Kaule.
U.S. Appl. No. 11/813,077, filed Jun. 28, 2007, Hoppe.
U.S. Appl. No. 11/779,707, filed Jul. 18, 2007, Fessl.
U.S. Appl. No. 11/816,514, filed Aug. 16, 2007, Kaule.
U.S. Appl. No. 11/909,115, filed Sep. 19, 2007, Kretschmar.
U.S. Appl. No. 11/913,658, filed May 14, 2008, Ruck.
U.S. Appl. No. 11/915,965, filed Nov. 29, 2007, Depta.
U.S. Appl. No. 12/294,222, filed Sep. 23, 2008, Hoffmuller.
U.S. Appl. No. 12/304,498, filed Dec. 12, 2008, Dichtl.
U.S. Appl. No. 12/304,522, filed Dec. 12, 2008, Dichtl.
U.S. Appl. No. 12/446,494, filed Apr. 21, 2009, Heim.
U.S. Appl. No. 12/515,923, filed May 21, 2009, Heim.
U.S. Appl. No. 12/517,848, filed Jun. 8, 2010, Gregarek.
U.S. Appl. No. 12/665,072, filed Dec. 17, 2009, Kaule.
U.S. Appl. No. 12/665,078, filed Dec. 17, 2009, Kaule.
U.S. Appl. No. 12/665,834, filed Dec. 21, 2009, Kaule.
U.S. Appl. No. 12/665,843, filed Dec. 21, 2009, Kaule.
U.S. Appl. No. 12/669,838, filed Jan. 20, 2010, Keller.
U.S. Appl. No. 12/673,805, filed Feb. 17, 2010, Dichtl.
U.S. Appl. No. 12/808,733, filed Jun. 17, 2010, Heim.
U.S. Appl. No. 12/809,002, filed Jun. 17, 2010, Heim.
U.S. Appl. No. 12/809,334, filed Jun. 18, 2010, Rahm.
U.S. Appl. No. 12/809,909, filed Jun. 21, 2010, Hoffmuller.
U.S. Appl. No. 12/865,461, filed Aug. 12, 2010, Hoffmuller.

(56) References Cited

OTHER PUBLICATIONS

U.S. Appl. No. 12/865,474, filed Aug. 15, 2010, Heim.
U.S. Appl. No. 12/920,764, filed Sep. 9, 2010, Heim.
U.S. Appl. No. 12/935,320, filed Oct. 2, 2010, Hoffmann.
U.S. Appl. No. 12/997,130, filed Dec. 9, 2010, Heim.
U.S. Appl. No. 12/997,323, filed Dec. 10, 2010, Heim.
U.S. Appl. No. 12/999,685, filed Dec. 17, 2010, Hoffmuller.
U.S. Appl. No. 13/002,117, filed Dec. 30, 2010, Hoffmuller.
U.S. Appl. No. 13/002,861, filed Jan. 6, 2011, Heim.
U.S. Appl. No. 13/062,991, filed Mar. 9, 2011, Kaule.
U.S. Appl. No. 13/387,437, filed Jan. 27, 2012, Dorfler.
U.S. Appl. No. 13/395,333, filed Mar. 9, 2012, Fuhse.
U.S. Appl. No. 13/496,552, filed Mar. 16, 2012, Schutzmann.
International Search Report, International Application No. PCT/EP2009/003791, 4 pages, Aug. 13, 2010.
International Preliminary Report on Patentability, International Application No. PCT/EP2009/003791, 8 pages, Mar. 1, 2011, English Translation.

* cited by examiner

SECURITY ELEMENT WITH OPTICALLY VARIABLE ELEMENT

CROSS-REFERENCE TO RELATED APPLICATIONS

This application is the U. S. National Stage of International Application No. PCT/EP2009/003791, filed May 28, 2009, which claims the benefit of German Patent Application DE 10 2008 028 187.5, filed Jun. 12, 2008; both of which are hereby incorporated by reference to the extent not inconsistent with the disclosure herewith.

The invention relates to a security element of at least one thin layer element in form of a multi-layer composition, capable of interference. The multi-layer composition, capable of interference, consists of at least one reflecting layer, at least one partially transmitting layer and at least one dielectric layer arranged between these layers.

For the protection against counterfeiting, in particular using color copiers or other reproduction methods, data carriers, as for example banknotes or cards, are equipped with security elements of at least one multi-layer composition, capable of interference. The protection against counterfeiting is thereby based thereon that the visually as well as simple and clearly recognizable optically variable effect of the multi-layer composition, capable of interference is not or only insufficiently reproduced by the above mentioned reproduction apparatuses.

Security elements of a multi-layer composition, capable of interference, are for example thin layer elements, which consist of a reflecting layer, a dielectric layer and a partially transmitting layer or an absorber layer. In case the security element is viewed from the side of the partially transmitting layer, the viewer perceives a particular color, which changes with a change of the viewing angle.

The reason for the color shifting is an interference effect between the light rays, which are reflected from the surface of the outer partially transmitting layer, and the light rays, which transmit through the outer partially transmitting and the middle dielectric layer and are reflected back from the inner reflecting layer to the partially transmitting layer. At the partially transmitting layer the light rays are thereafter either transmitted outward or reflected again, so that in this case the light rays are reflected back and forth several times between the reflecting layer and the partially transmitting layer. Thereby the light rays, which have transmitted the thin film layer, have covered a longer path than the light rays reflected on the surface of the thin film layer, so that they are phase shifted with respect to the latter, when they interfere with them.

In case the light rays incoming onto the thin film layer hit the thin film layer at different incoming angles, the path of the light rays covered in the thin film layer has different lengths. This difference results from the path difference of the rays reflected once or several times within the thin film layer, which path difference is modified by the incoming angle. Therefore the phase of the interfering light rays is different depending on the incoming angle, so that depending on the incoming angle different colors or tones of color of the resulting light beam perceived by the viewer are the result.

Such thin layer elements may be used in the form of foils. For example, from WO 2005/108110 a security element having a thin film layer element is known, in which the single layers are arranged over the full surface on the security element. By means of the impact of laser radiation identifiers in the form of patterns, characters, numbers or images are introduced into the layer sequence. For this purpose the layer sequence contains a marker layer of a color mixture, which comprises a mixture component absorbing in the laser radiation as well as a mixing component being transparent for the laser radiation. The identifiers are perceptible visually and/or by machine due to an irreversible change of the optical properties of the color mixture effected the impact of the laser radiation.

From DE 102 006 062 281 a security feature is known, in which an optically variable color with pigments is used, which have at least one multi-layer composition capable of interference. The color is printed with such little areal coverage, that it still transmit significant portions of the visible light in transmission. The pigments of the optically variable color are modified irreversibly in a partial region by means of an electromagnetic radiation, for example a laser, such that in this partial region the interference effect is modified clearly perceptible visually and/or by machine.

Preferably the pigments consist of a thin layer composition of a reflecting layer, a dielectric layer and a partially transmitting layer, wherein the laser modifies only the partially transmitting layer. An incident light-transmitted light-effect is generated, as in incident light (or reflection light) the reflecting layer of the lasered partial region is visible as silver colored marking, whereas the color tilt effect is visible outside the lasered partial regions. In contrast to that, in transmitted light the security element appears uniformly gray, as in the lasered partial regions the reflecting layer is not injured by the laser and all pigments are still opaque.

The security feature described in DE 102 006 062 281 is highly attractive and counterfeiting safe at the same time. What is of disadvantage only is, that optically variable colors with pigments are cost intensive in production and procurement. Besides that, for the production of the security element a laser demetallization is necessary, which has to satisfy vary high standards, in particular with respect to its focusing, as in laser demetallization exclusively the partially transmitting layer may be modified, without modifying neighboring layers. In addition to that it is not possible to generate visible information in transmitted light by means of structurings of the reflecting layer.

The invention is therefore based on the object to develop a security element of the type stated in the beginning further such, that the disadvantages of the state of the art are eliminated and the protection with respect to counterfeiting is increased further.

This object is solved by the features of the independent claims. Developments of the invention are subject of the dependent claims.

According to the invention both the reflecting layer and the partially transmitting layer has gaps: the at least one reflecting layer has a multitude of gaps in a first region of the security element and the at least one partially transmitting layer has at least one gap in a second region. The gap in the partially transmitting layer is configured as an alphanumeric character, a drawing or a pattern.

Alternatively the at least one partially transmitting layer has a multitude of gaps, which result in their entirety in an alphanumeric character, a drawing or a pattern. Here the partially transmitting layer does not comprise a complete, but a multitude of grid like arranged gaps. This has the advantage that the pattern visible in incident light or reflected light is somewhat less obvious, in return, however, disappears more reliably when viewed in transmitted light.

Also the multitude of gaps in the reflecting layer may result in its entirety in the form of at least one alphanumeric character, a drawing or a pattern. By the continuous and location dependent variation of the gap density or gap size more complex structures can be reduced therewith in transmitted light to the point of halftone images.

Preferably a thin continuous line in form of at least one alphanumeric character, a drawing or a pattern may also be arranged within the gaps of the reflecting layer. Such lines have line widths of at least 0.1 mm to 5 mm, preferably of 0.2 mm to 0.7 mm, particularly preferably of about 0.5 mm. Instead of lines certainly also areal regions can be configured without gap, such that the alphanumeric character, the pattern or the drawing made up by it is only recognizable in transmitted light, but not in incident light. By this additional security feature the security with respect to counterfeiting is thus further increased in an advantageous way.

According to the invention further the second region is at least partially arranged within the first region and the total area of the second region, which is at least partially arranged within the first region, is smaller than the total area of the first region. The first and the second region therefore overlap, wherein in the overlapping region the total area of the second region is smaller than the same of the first region.

In case the security element according to the invention is viewed from the partially transmitting layer, a different appearance arises in top view, and therefore in reflection, than in transmission view. Thereby the special effect of a marker visible in incident light, which disappears in transmitted light, is generated by the combination of the gaps in the partially transmitting layer and at the same time in the reflecting layer arranged below.

A viewing in incident light according to the invention is an illumination of the security element from one side and a viewing of the security element from the same side. A viewing in incident light is therefore the case for example when the front side of the security element is illuminated and also viewed.

A viewing in transmitted light according to the invention is an illumination of the security element from one side and a viewing of the security element from another side, in particular the opposite side. A viewing in transmitted light is therefore for example the case, when the back side of the security element is illuminated and the front side of the security element is viewed. The light therefore shines through the security element.

In a particularly preferred embodiment the multitude of gaps in the reflecting layer and/or the partially transmitting layer are arranged stochastic and/or grid like. A grid in the meaning of this invention is a uniform or non-uniform distribution of gaps, wherein the gaps are distanced from each other.

Herein the single gaps can be configured in arbitrary shapes. If here particular shapes of the gaps are chosen, then this can even represent an additional security feature, for example gaps in the form of a text or a micro-drawing. In case the gaps are configured circular and/or line shaped the preferred circle diameter and the preferred line width is 10 μm to 100 μm, respectively.

In order to avoid Moiré-effects, the two grids can be constructed as a stochastic grid. That means the distances of the single grid designs vary. In case regular point- or line grids are used, the Moiré-effects may be prevented effectively if an angle being significantly different from 0° is used between the legs of the grid unity cells of the two grids. Preferable are angles having odd degree numbers between 15° and 75°, particularly preferably 23°.

The portion of the total area of the multitude of gaps in the reflecting layer with respect to the total area of the reflecting layer is preferably 10% to 40% and particulary preferably about 20%. The portion of the total area of the gaps in the partially transmitting layer with respect to the total area of the region of the partially transmitting layer, in which appearance is visible in top view, is preferably 10% to 100% and particularly preferably 10% to 40%.

In a further embodiment also the dielectric layer is left open at the locations, at which the partially transmitting layer has gaps. This has the same optical effect as a gap of only the partially transmitting layer, but can be advantageous procedurally in manufacturing.

Additionally the multi-layer composition, capable of interference, can be combined with at least one optically active microstructure, for example a hologram, a sub-wavelength grating, a refractive microstructure, a matte structure or a blazed grating.

Further, the security element may comprise further security elements, such as fluorescence or security print, which are arranged in the register with respect to the at least one gap in the multi-layer composition, capable of interference. For example, different fluorescent materials can be printed onto the front- and backside of the security element. This has the advantage, that on the front- and the backside of the foil a different fluorescent image is recognizable, respectively, under UV-light.

The multi-layer composition, capable of interference, is preferably configured in three layers or five layers.

The three-layer composition consists of a reflecting layer, a middle dielectric layer and a partially transmitting layer, wherein both the reflecting layer and the partially transmitting layer comprises gaps.

The five-layer composition consists of a middle reflecting layer, two dielectric layers surrounding the middle reflecting layer on each side and two outer partially transmitting layers. A five-layer thin layer element therefore consists of one lower partially transmitting layer, followed by a dielectric layer, a middle reflecting layer, which is followed on the opposite side again by a dielectric layer, as well as finally of an upper partially transmitting layer. The five-layer composition therefore consists of two three-layer compositions, described above, which have a common reflecting layer. This has the advantage that a color tilt effect is visible from both sides. On the other hand, the upper and lower dielectric layer can be left open with different information content by which, for example, in incident light from the one side number "50" and from the opposite side in incident light a symbol "∈" appears. The corresponding information disappears in transmitted light.

In addition, the color tilt effect may be even chosen differently on both sides by choosing the thickness of the dielectric layer on both sides differently.

As materials for the corresponding layers of the composition, capable of interference, in particular are used:
for the reflecting layer reflecting substances, in particular metals, like aluminum, silver or copper,
for the dielectric layer $SiO_2$ (silicon dioxide), $ZrO_2$ (zirconium dioxide), $MgF_2$ (magnesium-difluoride) or $TiO_2$ (titanium dioxide) or different transparent materials, like very thin and extremely homogeneously printed transparent varnishes
for the partially transmitting layer chromium and/or nickel, iron, silver, gold or alloys there from, like Inconel™ (Ni—Cr—Fe).

Further materials for the respective layers of the composition, capable of interference, as well as in particular their respective layer thicknesses are mentioned in the printed publications WO 01/03945 A1, U.S. Pat. No. 6,586,098 B1 and U.S. Pat. No. 6,699,313 B2. The disclosure of the mentioned printed publications to this respect is included into the present application.

The invention is, however, not restricted only to three- or five-layer thin layer elements, but is applicable to many one- or multi-layer thin layer elements, which generate an optically variable effect. In particular, optically variable layers are known from the state of the art, which have, starting from the reflecting layer, in direction towards the viewer more than two layers. Also for thin layer elements, which are made from such optically variable layers and therefore have more than five layers, the invention is applicable.

The single layers of the security element can be printed onto a substrate and/or vapor deposited, for example by means of known printing processes or by means of vacuum vapor deposition, such as sputtering, reactive sputtering, Physical Vapor Deposition or Chemical Vapor Deposition. Thereby absorber materials, dielectrics and reflector materials are printed and/or vapor deposited in respectively superimposed or overlapping layers onto the substrate.

The metals to be considered for the reflecting and the partially transmitting layer are required in very thin layers having layer thicknesses of about 5 nm to 100 nm. Preferably these layers are applied by means of vacuum vapor deposition, wherein the respective material is heated and evaporated in vacuum by means of a heating device, for example a resistor or an electron beam. The metal precipitates then as thin layer on a foil moved above it. For applying the dielectric layer with layer thicknesses between 100 nm and 1 μm also the different variants of the vacuum vapor deposition methods are to be considered. In order to generate uniform colors, it is hereby necessary to keep the layer thickness extremely uniform, which in particular can be provided by sputtering or also by well-controlled thermal or electron beam vapor deposition methods. Alternatively the transparent dielectric can also be applied in form of a transparent color by means of a printing method. Herein, however, utmost diligence is required in the coating process in order to assure the required layer thickness uniformity with a tolerance of for example ±2%.

For the structuring and demetallization of the layers, respectively, advantageously the known methods, like washing processes, etching, oil-ablation, lift-off or laser demetallization, are used.

Advantageously therefore the effect known from DE 10 2006 062 281 is produced by vapor deposition and demetallization.

The security foil can be combined with further security elements, like fluorescence, possibly with different design on front- and backside, or with a precisely registered security print.

The security element according to the invention is preferably applied on a data carrier having a translucent, preferably transparent, region. The data carrier herein is in particular a value document, such as for example a banknote, a value paper, a credit or identity card, a passport, a certificate and anything similar, a branded article, a wrapping or another element for product security.

The translucent region is for example a window in a form of a through opening, which is covered by a translucent, preferably transparent foil. Therefore, the security element according to the invention is visible from both sides of the data carrier.

"Translucent" in this context means that the layer is semi-transparent, that means the layer has a light transmission of below 90% of the incident light, preferably between 80 and 20%. By transparency a light transmission of at least 90% is to be understood. In case the security element is applied on a translucent substrate having a light transmission of less than 90%, for example a very thin paper region, the size of the gaps is to be adapted, correspondingly, which results in a smaller contrast and a smaller intensity of the color tilt effect.

Based on the following embodiments or examples and the complementing figures the advantages of the invention are illustrated. The described single features and subsequently described exemplary embodiments are inventive as they are, but are also inventive in combination. The examples are preferred embodiments, to which however the invention shall in no way be restricted.

Further the representations in the figures are for better understanding very schematic and do not show the real situation. In particular the proportions shown in the figures do not correspond to the situation in reality and serve exclusively for improving clearness. Further, the embodiments described in the following examples are reduced for better understanding to the essential core information. For conversion into practice significantly more complex patterns or images may be used.

Figure 2:
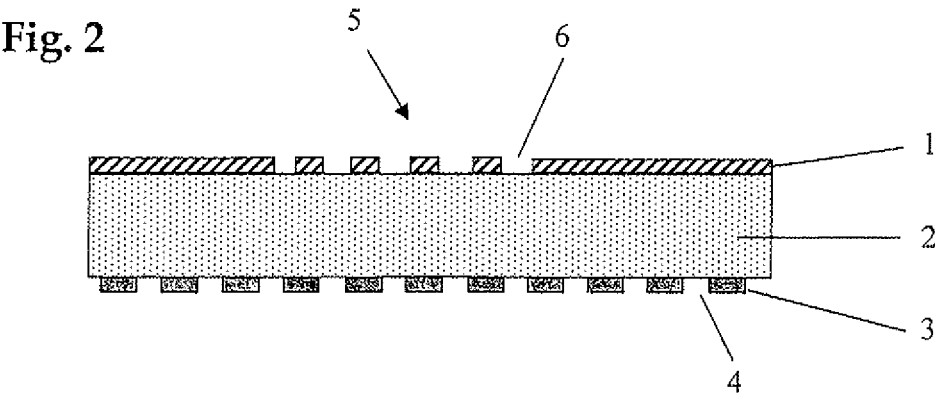
Figure 3:
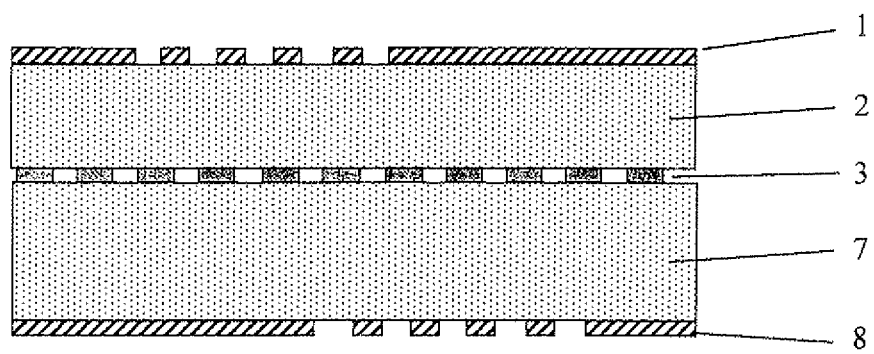
Figure 4:
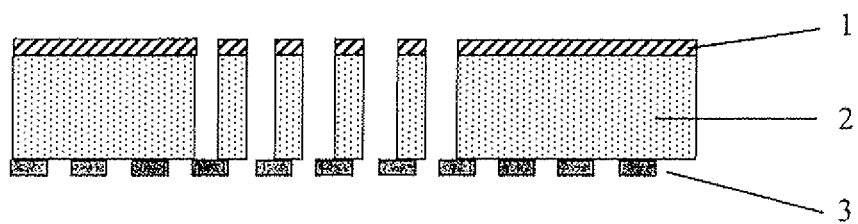
Figure 5:
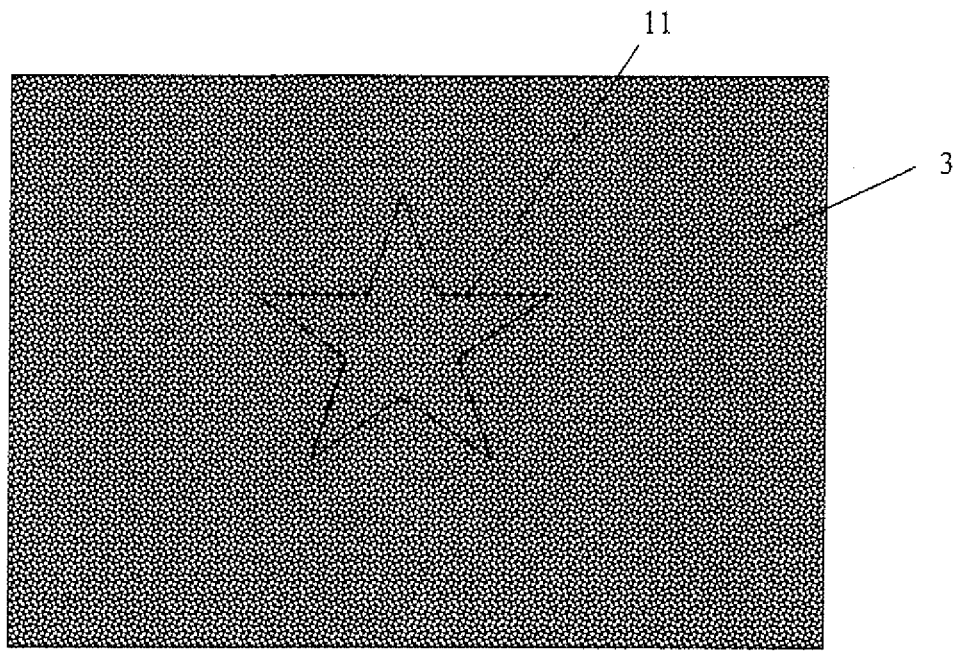
Figure 6:
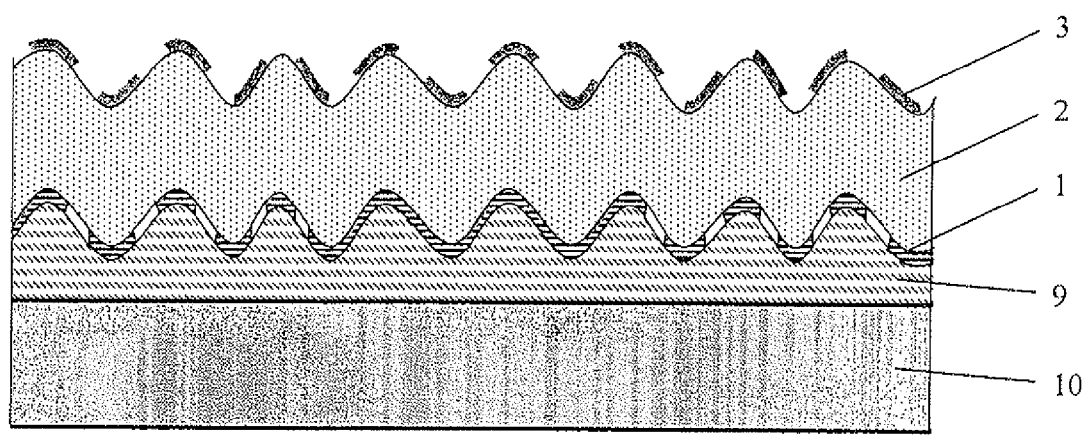

In detail, the figures show schematically:

FIG. 1 a three-layer composition, capable of interference, of a partially transmitting layer having a gap and a reflecting layer having a multitude of grid-like arranged gaps, FIG. 2 a three-layer composition, capable of interference, of a partially transmitting layer and a reflecting layer having each a multitude of grid-like arranged gaps, FIG. 3 a five-layer-composition, capable of interference, of two partially transmitting layers and a middle reflecting layer having each a multitude of grid-like arranged gaps, FIG. 4 a three-layer composition, capable of interference, according to FIG. 1, in which the dielectric layer comprises gaps analogously to the partially transmitting layer, FIG. 5 a three-layer composition, capable of interference, according to FIG. 1 viewed from the side of the reflecting layer, having a continuous line in form of a star within the grid-like arranged gaps of the reflecting layer, FIG. 6 a three-layer composition, capable of interference, according to FIG. 1 in backward sequence, which is applied on an embossing lacquer having an embossing structure and a substrate.

FIG. 1 shows a thin layer composition according to the invention in form of a three-layer composition, capable of interference, of a partially transmitting layer 1 having a gap 5 and a reflecting layer 3 having a multitude of grid-like arranged gaps 4. Between the partially transmitting layer 1 and the reflecting layer 3 a dielectric layer 2 is arranged over the full area.

A viewer, which views from the side of the partially transmitting layer 1 onto the security element, perceives in incident light (or reflected light) in the areas outside the gap 5 a color tilt effect. Thereby the color of the thin layer composition changes, for example from green to red, when tilting the security element from green to red. In the region of the gap 5 the viewer perceives under almost all viewing angles the color of the reflecting layer 3, for example the color gray. In case the gap 5 is for example configured in form of the number "50", the viewer sees, when tilting the security element, from almost all viewing angles the gray number "50", around the number "50", however, a color tilt effect from green to red.

The grid-like arranged gaps 4 are configured circular and/or line shaped, wherein the circular gaps have the diameter of 10 microns to 100 microns, preferably of 30 microns to 50 microns, and the line shaped gaps have a width of 30 microns to 70 microns.

In contrast thereto, in transmitted light, light passes through the multitude of the gaps 4 of the reflecting layer 3 and through the remaining layers of the thin film composition, such that the viewer perceives both within and also outside the gap 5 no color tilt effect, but a uniform gray area.

In case the viewer looks from the side of the reflecting layer 3 onto the security element, he perceives in incident light the light reflected from the reflecting layer 3 and in a transmitted light the light passing through the gaps 4. Therefore the viewer perceives in incident light a metal like shining area and in transmitted light an uniformly gray area.

Depending on the configuration of the gap 5 in the partially transmitting layer 1 also the gap 5 makes in transmitted light, viewed from the front side of the security element, more or less an appearance. In order to prevent this, the gap 5 is replaced by a multitude of gaps 6 according to FIG. 2. By this the contrast perceivable in incident light between the regions 5 and 1 is somewhat reduced, in return this leads to the region 5 to be outshined in transmitted light such, that it is not noticed anymore by the viewer.

The two embodiments according to FIG. 1 and FIG. 2 can also be modified to this effect, by configuring them double-sided according to FIG. 3. Herein a common reflecting layer 3, which comprises the grid-like gaps, between the two dielectric layers 2 and 7. On the side of the respective dielectric layer 2 and 7, which is opposite to the reflecting layer 3, a partially transmitting layer 1 and 8 is arranged, respectively. Both partially transmitting layers 1 and 8 comprise gaps according to the exemplary embodiment of FIG. 2.

Herein it is particularly advantageous, that a color tilt effect is visible from both sides. On the other hand the partially transmitting layer 1 on the dielectric layer 2 and the partially transmitting layer 8 on the dielectric layer 7 can be left open with different information. In incident light from the one side, for example, the number "50" appears and from the opposite side in incident light the symbol "∈" appears, wherein the respective information disappears in transmitted light.

Without limiting the optical effect of the effect, according to FIG. 4 also the dielectric layer 2 can be left open at the locations, at which the partially transmitting layer 1 has gaps. This is shown by way of example in FIG. 4 at the exemplary embodiment according to FIG. 2.

FIG. 5 shows a three-layer composition, capable of interference according to FIG. 1 in transmitted light, viewed from the side of the reflecting layer 3. A thin continuous line 11 in form of a star is located within in the grid-like arranged gaps 4 of the reflecting layer. To be effective the line has a width of 0.1 mm to 5 mm so that the line is sufficiently noticeable in transmitted light. In incident light it cannot be noticed by a viewer, almost independent of its line width, as the color tilt effect noticeable in incident light between the regions of reflecting layer over the full area and of left open reflecting layer does practically not differ. In transmitted light the viewer therefore sees the star in addition to the effects described with respect to FIG. 1 and in incident light only the effects described with respect to FIG. 1 without the star.

Particularly advantageously the security element according to the invention is combined with known optically active microstructures, as for example diffractive embossed holograms, Zero Order Gratings, refractive microstructures, such as Blazed Gratings and such.

FIG. 6 shows by way of example such a combination with an embossed hologram, wherein the following three-layer composition, capable of interference, was chosen: a reflecting layer 3 having grid-like arranged gaps on a dielectric layer 2 and a partially transmitting layer 1, which comprises gaps arranged grid-like in two regions. This composition is applied on an embossing lacquer 9 with a diffractive embossing structure and a substrate 10.

This security feature shows from the frontside a first color tilt effect, for example from magenta to green, and from the backside a second color tilt effect, for example from green to magenta. In addition to that in incident light from the backside as well as from the front side different picture information, for example a "∈"-sign and a "$"-sign, can be seen within the color layer. In transmitted light the color impressions then disappear completely and merely a light/dark-image appears, for example a gray scale portrait. In addition to that a design can be seen from both sides, which is determined by the embossing structure. Advantageously known hologram-design elements can be used for diffractive embossing structures. The hologram information is from the front- and the backside in the same way visible, however, mirror imaged to each other. In transmitted light the hologram information disappears.

The exemplary embodiment according to FIG. 6 self evidently can also be composed with the reverse layer sequence on the embossing layer, that means in the sequence embossing lacquer, reflecting layer, dielectric layer and partially transmitting layer on the embossing lacquer 9 having a diffractive embossing structure and the substrate 10. In the same way also an embodiment corresponding to FIG. 3 is possible, that means, respectively, an optically variable thin layer element can be composed on both sides of the embossing lacquer 9.

The invention claimed is:

1. A security element comprising at least one multi-layer composition, which composition is capable of interference and consists of at least one reflecting layer, at least one partially transmitting layer and at least one dielectric layer arranged between the reflecting layer and the partially transmitting layer, wherein the at least one reflecting layer comprises in a first region of the security element a multitude of gaps and the at least one partially transmitting layer comprises in a second region of the security element at least one gap in form of an alphanumeric character, a drawing or a pattern, or a multitude of gaps, which result in their entirety in an alphanumeric character, a drawing or a pattern, and the second region is arranged at least partially within the first region when the second region and the first region of the security element are viewed in vertical cross section and the total area of the part of the second region which is at least partially arranged within the first region is smaller than the total area of the first region and the security element, when viewed from the partially transmitting layer, displays a different appearance in top view than when viewed in transmission and the multitude of gaps in the reflecting layer and the partially transmitting layer are arranged stochastic or in a grid and the portion of the total area of the multitude of gaps in the reflecting layer is 10% to 40% with respect to the total area of the reflecting layer and the portion of the total area of the gaps in the partially transmitting layer is 10% to 100% with respect to the total area of the region of the partially transmitting layer, in which an appearance is visible in top view;

wherein the at least one partially transmitting layer comprises a material that is partially transmitting of light.

2. The security element according to claim 1, characterized in that the gaps in the at least one reflecting layer and the gaps in the at least one partially transmitting layer are each independently configured either circular or line shaped.

3. The security element according to claim 1, characterized in that the gaps in the at least one reflecting layer and the gaps in the at least one partially transmitting layer are each configured circular and have a diameter of 10 microns to 100 microns.

4. The security element according to claim 2, wherein the gaps in the reflecting layer and the gaps in the partially transmitting layer are arranged each in a regular grid, each regular grid being defined by a grid unit cell having one or two legs, and wherein an angle significantly different from 0° is used between the legs of the grid unity cells of the two grids.

5. The security element according to claim 1, characterized in that the portion of the total area of the multitude of gaps in the reflecting layer is about 20% with respect to the total area of the reflecting layer.

6. The security element according to claim 1, characterized in that the portion of the total area of the gaps in the partially transmitting layer is 10% to 40% with respect to the total area of the region of the partially transmitting layer, in which an appearance is visible in top view.

7. The security element according to claim 1, characterized in that the multitude of the gaps in the reflecting layer result in their entirety in the shape of at least one alphanumeric character, a drawing or a pattern.

8. The security element according to claim 1, characterized in that the multi-layer composition, capable of interference, is configured in three layers and consists of a reflecting layer, a middle dielectric layer and a partially transmitting layer.

9. The security element according to claim 1, characterized in that the multi-layer composition, capable of interference, is configured in five layers and consists of a middle reflecting layer, two dielectric layers surrounding the middle reflecting layer on each side, and two outer partially transmitting layers.

10. The security element according to claim 1, characterized in that at the locations, at which the partially transmitting layer has gaps, also the dielectric layer is left open.

11. The security element according to claim 1, characterized in that the multi-layer composition, capable of interference, is combined with at least one optically active micro structure, for example a hologram, a sub wavelength grating, a refractive micro structure, a matte structure or a blazed grating.

12. The security element according to claim 1, characterized in that the security element comprises further security elements, such as fluorescence or security print, which are arranged in the register with respect to the at least one gap in the multi-layer composition, capable of interference.

13. A method of producing the security element according to claim 1, characterized in that the at least one reflecting layer and the at least one partially transmitting layer are printed or vapor deposited onto the at least one dielectric layer at least in partial regions and the at least one gap is generated by demetallization.

14. The method according to claim 13, characterized in that the vapor depositing of the single layers is performed by mans of vacuum vapor deposition, such as sputtering, reactive sputtering, Physical Vapor Deposition or Chemical Vapor Deposition.

15. The method according to claim 13, characterized in that the demetallization is performed by means of washing processes, etching, oil-ablation, lift-off or laser demetallization.

16. The method according to claim 14, characterized in that the demetallization is performed by means of washing processes, etching, oil-ablation, lift-off or laser demetallization.

17. The security element according to claim 1, characterized in that the gaps in the at least one reflecting layer and the gaps in the at least one partially transmitting layer are configured line shaped and have a width of 30 microns to 70 microns.

* * * * *